United States Patent
Khan et al.

(10) Patent No.: US 10,024,608 B2
(45) Date of Patent: Jul. 17, 2018

(54) HEAT EXCHANGER

(71) Applicant: JOHNSON CONTROLS TECHNOLOGY COMPANY, Holland, MI (US)

(72) Inventors: Tabraiz Ali Khan, Wichita, KS (US); Robert Cabrera, Wichita, KS (US); Gregory Kenneth Reaser, Wichita, KS (US); Terry Hill, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 646 days.

(21) Appl. No.: 14/594,834

(22) Filed: Jan. 12, 2015

(65) Prior Publication Data

US 2015/0121935 A1 May 7, 2015

Related U.S. Application Data

(63) Continuation of application No. 13/768,123, filed on Feb. 15, 2013, now Pat. No. 8,955,507, which is a continuation of application No. 12/141,366, filed on Jun. 18, 2008, now Pat. No. 8,393,318.

(60) Provisional application No. 60/945,698, filed on Jun. 22, 2007.

(51) Int. Cl.
| | |
|---|---|
| *F28F 19/00* | (2006.01) |
| *F24H 3/08* | (2006.01) |
| *F24H 8/00* | (2006.01) |
| *F28D 7/16* | (2006.01) |
| *F28F 17/00* | (2006.01) |
| *F23M 5/00* | (2006.01) |
| *B23P 15/26* | (2006.01) |
| *F25D 21/14* | (2006.01) |

(Continued)

(52) U.S. Cl.
CPC .............. *F28F 19/00* (2013.01); *B23P 15/26* (2013.01); *F23M 5/00* (2013.01); *F24H 3/087* (2013.01); *F24H 8/00* (2013.01); *F25D 21/14* (2013.01); *F28D 7/1615* (2013.01); *F28F 1/12* (2013.01); *F28F 17/005* (2013.01); *F28F 21/08* (2013.01); *Y02B 30/102* (2013.01); *Y10T 29/4935* (2015.01); *Y10T 29/49364* (2015.01)

(58) Field of Classification Search
CPC ... F24H 3/06; F24H 3/065; F24H 8/00; F24H 8/006; F28F 19/002; F28F 19/06
USPC ....................................... 126/99 R
See application file for complete search history.

(56) References Cited

U.S. PATENT DOCUMENTS

| | | |
|---|---|---|
| 1,641,975 A | 9/1927 | Jones |
| 1,962,599 A | 6/1934 | Keen |
| 1,992,032 A | 2/1935 | Kermer |

(Continued)

FOREIGN PATENT DOCUMENTS

| | | | | |
|---|---|---|---|---|
| EP | 1577631 A1 | 9/2005 | | |
| GB | 415370 A | * 8/1934 | ............ | F28F 9/0229 |
| GB | 1477323 | 7/1974 | | |

*Primary Examiner* — Jorge Pereiro
(74) *Attorney, Agent, or Firm* — Fletcher Yoder, PC

(57) ABSTRACT

A furnace or other heat exchanger application for heating, ventilation, air conditioning and refrigeration systems having condensate control. Specifically, a condensate control for secondary heat exchangers is provided for use with high efficiency furnaces, particularly for small tonnage systems, such as residential or unitary systems. Condensate management permits a plurality of furnace orientations while providing resistance to corrosion due to liquid condensate.

20 Claims, 8 Drawing Sheets

(51) Int. Cl.
*F28F 1/12* (2006.01)
*F28F 21/08* (2006.01)

(56) References Cited

U.S. PATENT DOCUMENTS

| | | |
|---|---|---|
| 2,034,278 A | 3/1936 | Becket et al. |
| 2,228,549 A | 1/1941 | Young |
| 2,247,849 A | 7/1941 | Ritter |
| RE22,027 E | 2/1942 | Bay |
| 2,693,941 A | 11/1954 | Bystrom |
| 2,983,115 A | 5/1961 | Caswell |
| 3,182,720 A | 5/1965 | Brown |
| 3,240,266 A | 3/1966 | Corbet et al. |
| 3,257,710 A | 6/1966 | Brown et al. |
| 3,448,804 A | 6/1969 | Kreiselmaier |
| 3,471,178 A | 10/1969 | Roe |
| 3,675,710 A | 7/1972 | Ristow |
| 3,688,838 A | 9/1972 | Sturm et al. |
| 3,807,494 A | 4/1974 | Ris |
| 3,934,798 A | 1/1976 | Goldsmith |
| 3,944,136 A | 3/1976 | Huie |
| 3,972,974 A | 8/1976 | Pico |
| 4,041,594 A | 8/1977 | Chartet |
| 4,071,083 A | 1/1978 | Droin |
| 4,099,556 A | 7/1978 | Roberts, Jr. |
| 4,159,035 A | 6/1979 | Chartet |
| 4,165,783 A | 8/1979 | Oplatka |
| 4,175,308 A | 11/1979 | Togashi |
| 4,177,859 A | 12/1979 | Gatti et al. |
| 4,182,408 A | 1/1980 | Laber |
| 4,206,806 A | 6/1980 | Togashi |
| 4,272,006 A | 6/1981 | Kao |
| 4,288,109 A | 9/1981 | Ellis |
| 4,303,122 A | 12/1981 | Powell |
| 4,373,580 A | 2/1983 | Gossalter |
| 4,421,789 A | 12/1983 | Kaneko et al. |
| 4,494,598 A | 1/1985 | DeHaan et al. |
| 4,537,178 A | 8/1985 | Hwang et al. |
| 4,547,943 A | 10/1985 | Hoeffken |
| 4,555,536 A | 11/1985 | Maki et al. |
| 4,561,421 A | 12/1985 | Hwang et al. |
| 4,578,850 A | 4/1986 | Kerr et al. |
| 4,582,891 A | 4/1986 | Maki et al. |
| 4,603,681 A | 8/1986 | Clawson |
| 4,621,686 A | 11/1986 | Ahn |
| 4,622,947 A | 11/1986 | Hays et al. |
| 4,653,466 A | 3/1987 | DeHaan et al. |
| 4,653,575 A | 3/1987 | Courchesne |
| 4,681,085 A | 7/1987 | Clawson |
| 4,706,743 A | 11/1987 | Chalimbaud |
| 4,738,310 A | 4/1988 | Luttenberger et al. |
| 4,794,983 A | 1/1989 | Yoshida et al. |
| 4,795,662 A | 1/1989 | Kreiselmaier |
| 4,848,645 A | 7/1989 | Franzolini et al. |
| 4,860,725 A | 8/1989 | Tallman et al. |
| 4,880,054 A | 11/1989 | Yoshida et al. |
| 4,897,908 A | 2/1990 | Henriksson |
| 4,974,579 A | 12/1990 | Shellenberger et al. |
| 5,133,299 A | 7/1992 | Rogan |
| 5,141,048 A | 8/1992 | Sausner |
| 5,178,124 A | 1/1993 | Lu et al. |
| 5,228,315 A | 7/1993 | Nagasaka et al. |
| 5,313,930 A | 5/1994 | Kujawa et al. |
| 5,322,050 A | 6/1994 | Lu |
| 5,323,849 A | 6/1994 | Korczynski, Jr. et al. |
| 5,347,980 A | 9/1994 | Shellenberger |
| 5,370,175 A | 12/1994 | Waterman et al. |
| 5,379,751 A | 1/1995 | Larsen et al. |
| 5,406,933 A | 4/1995 | Lu |
| 5,437,263 A | 8/1995 | Ellingham et al. |
| 5,439,050 A | 8/1995 | Waterman et al. |
| 5,448,986 A | 9/1995 | Christopher et al. |
| 5,474,122 A | 12/1995 | Pierce |
| 5,538,079 A | 7/1996 | Pawlick |
| 5,579,834 A | 12/1996 | Chiba |
| 5,699,852 A | 12/1997 | Park et al. |
| 5,749,355 A | 5/1998 | Roan et al. |
| 5,775,318 A | 7/1998 | Haydock et al. |
| 5,820,931 A | 10/1998 | Kreiselmaier |
| 5,918,667 A | 7/1999 | Chiba et al. |
| 5,979,433 A | 11/1999 | O'Brien |
| 5,979,545 A | 11/1999 | Pierce |
| 5,983,890 A | 11/1999 | Thomas et al. |
| 6,006,741 A | 12/1999 | Daddis, Jr. |
| 6,254,930 B1 | 7/2001 | Kreiselmaier |
| 6,609,531 B2 | 8/2003 | Lesko |
| 6,722,422 B1 | 4/2004 | Feldmeier |
| 6,923,173 B2 | 8/2005 | Schonberger, Sr. |
| 6,971,335 B2 | 12/2005 | Kobayashi et al. |
| 7,048,042 B2 | 5/2006 | Juschka |
| 7,182,574 B2 | 2/2007 | Lyons |
| 2002/0053505 A1 | 5/2002 | Arrison |
| 2005/0061494 A1 | 3/2005 | Tsuji et al. |
| 2005/0092316 A1 | 5/2005 | Schonberger, Sr. |
| 2005/0167091 A1 | 8/2005 | Juschka |
| 2006/0099072 A1 | 5/2006 | Lyons |
| 2007/0160868 A1 | 7/2007 | Watanabe et al. |

\* cited by examiner

HEAT EXCHANGER

CROSS REFERENCE TO RELATED PATENT APPLICATIONS

This application is a continuation of application Ser. No. 13/768,123, filed Feb. 15, 2013, entitled HEAT EXCHANGER, which is a continuation of application Ser. No. 12/141,366, filed Jun. 18, 2008, entitled HEAT EXCHANGER, which claims the benefit of U.S. Provisional Application No. 60/945,698, filed Jun. 22, 2007, entitled FURNACE HEAT EXCHANGER CONDENSATE CONTROL, which Applications are herein incorporated by reference in their entirety.

BACKGROUND

The present application relates generally to high efficiency furnaces and applications utilizing condensation of combustion gases in heating, ventilation, air conditioning and refrigeration systems.

The basic components of a furnace system include a burner, at least one heat exchanger, an air distribution system, and an exhaust. In the burner, gas, such as natural gas or propane, oil or other fuel is delivered and burned to generate heat. A primary heat exchanger transfers heat from the burning gas to the air distribution system. One or more additional secondary heat exchangers may transfer additional heat from the gases from the primary heat exchanger to air in the air distribution system, typically resulting in condensation of the combustion gases. A vent pipe or flue exhausts byproducts of combustion, such as water vapor and carbon dioxide, outside of the space and condensate is drained from the system. The air distribution system, which includes a blower and ductwork, delivers the heated air throughout the space and returns cooler air to the furnace to be heated. High-efficiency gas furnaces, commonly known as condensing furnaces extract so much heat from the flue gas that the water vapor in the flue gas condenses into liquid water, so the furnace produces water as a normal part of its operation. In some cases, if the combustion air to the furnace is not clean, the condensed water or condensate can be corrosive. Materials, such as high-grade stainless steels, that are both corrosion-resistant and heat-resistant, are expensive.

Intended advantages of the systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

The application is directed to heat exchanger applications for heating, ventilation, air conditioning and refrigeration systems. Specifically, secondary heat exchangers for use with high efficiency furnaces, particularly for small tonnage systems, such as residential or unitary systems.

The application includes a furnace including a first heat exchanger and a second heat exchanger in fluid communication with the first heat exchanger. The furnace also includes a first panel being connected to the first heat exchanger and the second heat exchanger. The furnace also includes a second panel positioned opposite the first panel, the second panel being connected to the first heat exchanger and the second heat exchanger. The furnace also includes a first corrosion resistant body affixed to the first panel, the first corrosion resistant body being positioned near the second heat exchanger to prevent condensate from the second heat exchanger from contacting the first panel. The furnace also includes a second corrosion resistant body affixed to the second panel, the second corrosion resistant body being positioned near the second heat exchanger to prevent condensate from the second heat exchanger from contacting the second panel. The furnace also includes the first corrosion resistant body having a surface area less than the first panel and larger than an end of the second heat exchanger. The furnace also includes the second corrosion resistant body having a surface area less than the second panel and larger than an end of the second heat exchanger.

The application also includes a heat exchanger having a first panel. The heat exchanger includes a second panel positioned opposite the first panel. The heat exchanger includes a plurality of tubes, the plurality of tubes each having a first end connected to the first panel and a second end opposite the first end connected to the second panel, the plurality of tubes being positioned to permit flow of heat transfer fluid from the second end to the first end. The heat exchanger also includes a plurality of conduits, the plurality of conduits each having a first end connected to the first panel and a second end opposite the first end connected to the second panel, the plurality of conduits being positioned to permit flow of heat transfer fluid from the first end to the second end, the first ends of the plurality of conduits being positioned to receive heat transfer fluid form the first ends of the plurality of tubes. The heat exchanger includes a first corrosion resistant body laminated to a surface of the first panel, the first corrosion resistant body being in physical contact with the plurality of conduits to prevent condensate from the plurality of conduits from contacting the surface of the first panel. The heat exchanger also includes a second corrosion resistant body laminated to a surface of the second panel, the second corrosion resistant body being in physical contact with the plurality of conduits to prevent condensate from the plurality of conduits from contacting the surface of the second panel. The heat exchanger also includes the first corrosion resistant body having a surface area less than the first panel and surrounding the first end of the plurality of conduits. The heat exchanger also includes the second corrosion resistant body having a surface area less than the second panel and surrounding the second end of the plurality of conduits.

The application further includes a method of assembling a furnace connecting a first heat exchanger between a first panel and a second panel. The method also includes connecting a second heat exchanger between the first panel and the second panel, the second heat exchanger including a plurality of conduits. The method includes laminating a first plate to the first panel, the first plate including a corrosion resistant material, and laminating a second plate to the second panel, the second plate including a corrosion resistant material. The method also includes conforming the first plate to first ends of the plurality of conduits to place the first plate in physical contact with the first ends of the plurality of conduits. The method also includes conforming the second plate to second ends of the plurality of conduits to place the second plate in physical contact with the second ends of plurality of conduits. The method includes the first plate having a surface area less than the first panel and surrounding the first end of the plurality of conduits; and the second plate having a surface area less than the second panel and surrounding the second end of the plurality of conduits.

The condensate collector includes, but is not limited to, structures such as a drip pan, tapered geometries at the end of the conduits and combinations thereof.

The application provides condensate management to permit a plurality of furnace orientations without excessive corrosion due to liquid condensate, while providing a furnace system that utilizes less expensive materials and is easily fabricated.

An advantage of this application is to show a furnace design in which the usage of high-cost materials is minimized, thus reducing the cost of the furnace, while still maintaining the required corrosion resistance and heat resistance areas of the furnace where corrosion resistance is desired.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
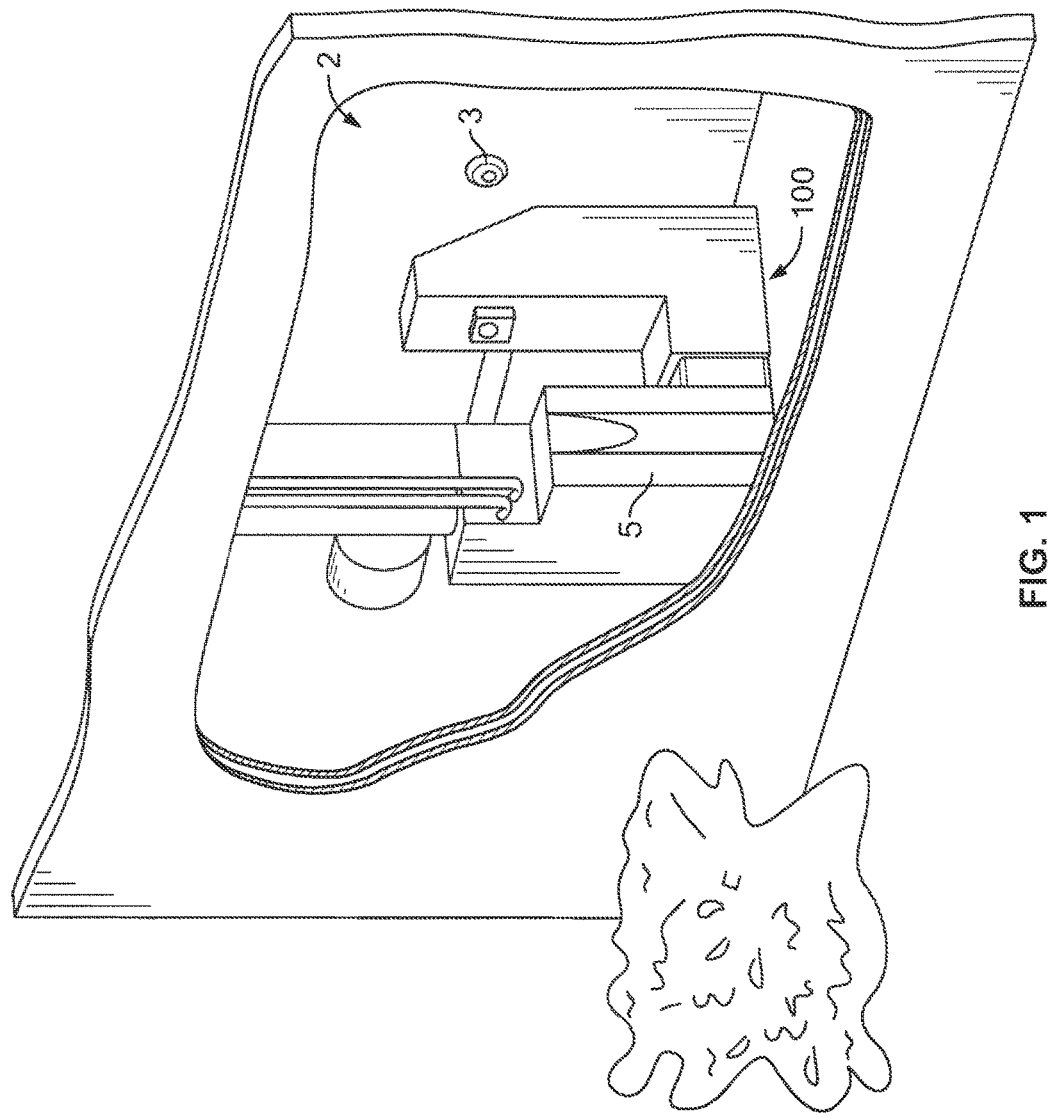
FIG. 1 is an illustration of an exemplary heating, ventilation, air conditioning and refrigeration system disposed in a residential setting.

FIG. 1 shows an exemplary furnace 100 in a typical residential setting 2. Furnace 100 is disposed within an enclosed space of the residential setting 2. In furnace 100, air is drawn into furnace 100 and subsequently heated by exchanging heat with products of combustion generated by burning a fuel in furnace 100. A thermostat 3 or similar device that monitors and controls the conditions within the enclosed space may be used to provide temperature control to the enclosed space by controlling the operation of furnace 100. An air distribution system 5 including an air mover such as a blower or other similar device may be used to distribute air to the enclosed space in residential setting 2. In another embodiment, furnace 100 can be incorporated in a heating, ventilation and air conditioning system for the enclosed space. The heating, ventilation and air conditioning system can provide both heating to the enclosed space using furnace 100 and cooling to the enclosed space using a vapor compression system.

Figure 2:
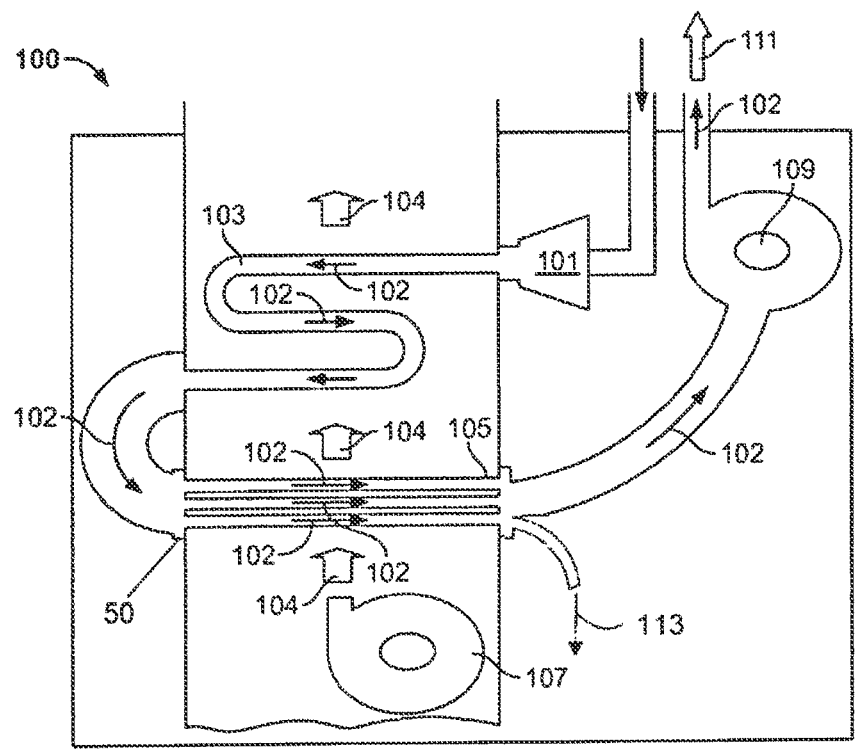
FIG. 2 is a schematic arrangement of a furnace according to an embodiment of the disclosure.

FIG. 2 shows a schematic arrangement of a furnace 100 according to an embodiment of the disclosure. During operation, a burner 101 combusts a fuel within combustion air 102 and provides combustion products and heated air as a heat transfer fluid which is provided to a first heat exchanger 103, where heat is transferred to a supply air 104. Supply air 104 is air that is to be heated, such as interior air for a building HVAC system. Combustion air 102 is then directed into a second heat exchanger 105 by header 50, where heat is exchanged with supply air 104. Supply air 104 is directed over first heat exchanger 103 and second heat exchanger 105 by use of a blower 107 or similar air-moving device. Combustion air 102 is then exhausted from the system by use of an exhaust blower 109 or similar air-moving device. Exhaust 111 includes air, water vapor and other combustion products.

Furnace 100 provides heat to supply air 104 by use of first heat exchanger 103 and second heat exchanger 105. As combustion air 102 exchanges heat with the supply air, a portion of combustion air 102 condenses to a liquid. The resultant liquid condensate 113 is then directed from second heat exchanger 105 and out of furnace 100.

Condensate 113 is liquid formed in the second heat exchanger, in addition to water contains combustion products and other contaminants that may be acidic and/or corrosive. Second heat exchanger 105 and the areas in which the condensate flow are fabricated using corrosion resistant materials such as stainless steel, such as 29-4C stainless steel or 2205 stainless steel or other heat resistant, corrosion resistant materials.

Figure 3:
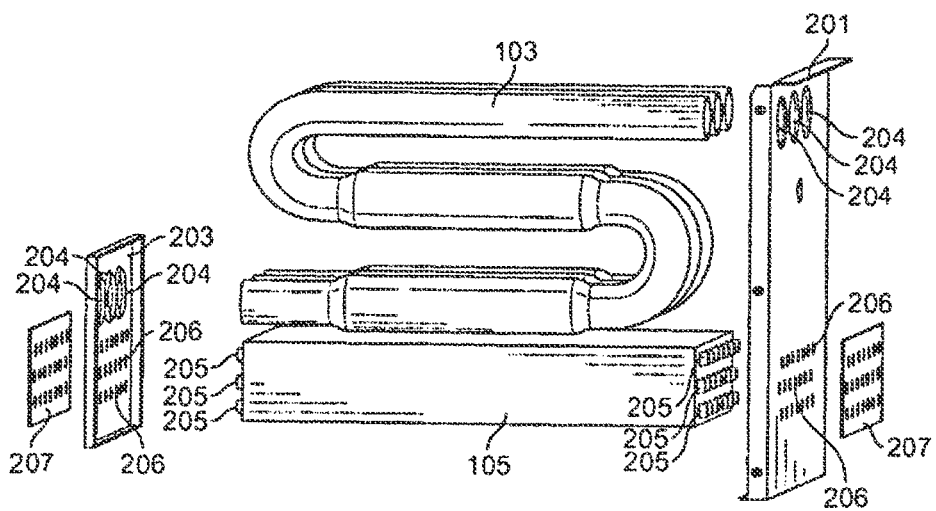
FIG. 3 is an exploded view of a portion of a furnace according to an embodiment of the disclosure.

FIG. 3 shows an exploded view of a portion of the furnace system according to an embodiment of the disclosure. First heat exchanger 103 and second heat exchanger 105 each attach to a first panel 203 and a second panel 201 through openings 204 and openings 206. The connection between first heat exchanger 103 and second heat exchanger 105 and second panel 201 and first panel 203 may be any connection known in the art for joining metallic components. First panel 203 and second panel 201 include openings 204, which are configured to receive first heat exchanger 103. Openings 204 permit the connection of first heat exchanger 103 and permits the passage of heat transfer fluid through first panel 203 and second panel 201. Likewise, conduits 205 of second heat exchanger 105 are configured to permit flow of heat transfer fluid through first panel 203 and second panel 201. First panel 203 and second panel 201 include opening 206, which are connectable to the conduits 205, such as tubes, and permit passage of heat transfer fluid through first panel 203 and second panel 201. The heat transfer fluid or combustion air 102 (see FIG. 2) is preferably provided to second heat exchanger 105 in a vapor phase. As the gaseous heat transfer fluid exchanges heat within conduits 205, a portion of the heat transfer fluid may condense and form liquid condensate. The liquid condensate is flowable and may escape conduits 205 at one or both ends.

Conduits 205 of second heat exchanger 105 are fabricated from and include a corrosion resistant material, such as stainless steel. While not so limited, first panel 203 and second panel 201 include a less corrosion resistant and/or less expensive material, such as aluminum or alloy steel. In addition, corrosion resistant bodies 207 are attached to both first panel 203 and second panel 201. In one embodiment body 207 may be a plate. Bodies 207 are positioned on first panel 203 and second panel 201 in close proximity to the ends of conduits 205. The term "in close proximity", as utilized herein, means that the components are near, in proximity or in physical contact with each other. Positioning of bodies 207 on first panel 203 and second panel 201 is such that condensate flowing from conduits 205 is substantially prevented from contacting the surface of first or second panels 203, 201. Bodies 207 may be laminated onto first or second panels 203, 201 in any conventional manner, including, but not limited to brazing, welding, adhesive bonding or other metallic joining processes. Bodies 207 are preferably fabricated from and include a high temperature, corrosion resistant material, such as stainless steel. Suitable corrosion resistant material for fabrication of bodies 207, include, but are not limited to, stainless steel, such as 29-4C stainless steel or Grade 2205 stainless steel, corrosion resistant metal or alloys or high temperature polymeric material.

Figure 4:
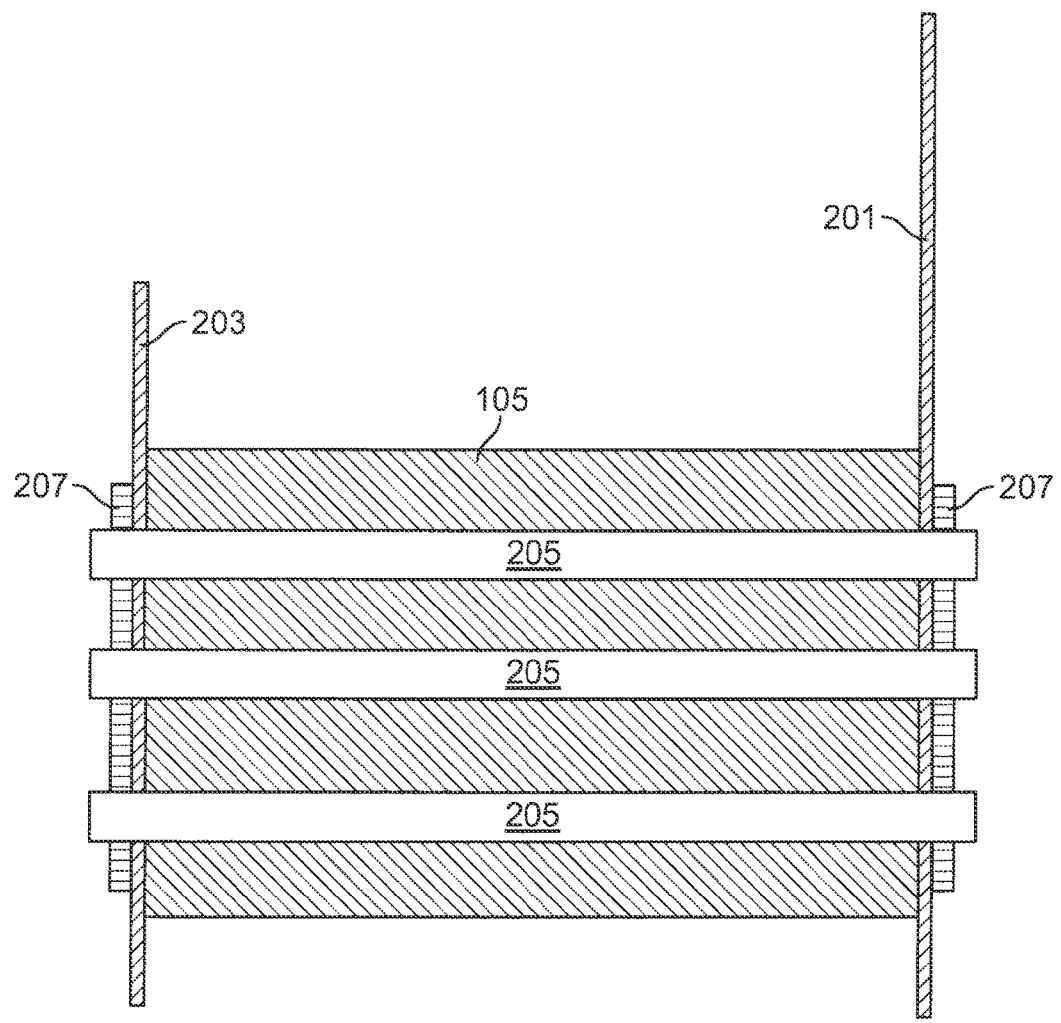
FIG. 4 is a cross-section view of a portion of a furnace according to an embodiment of the disclosure.

FIG. 4 shows a second heat exchanger 105 for use with the present disclosure including corrosion resistant bodies 207 affixed to each of first panel 203 and second panel 201. As second heat exchanger 105 operates, condensate forms within conduits 205 from condensation of heat transfer fluid. While operating, the condensate is urged in the direction of the exhaust or otherwise in a direction toward front plate 201 by the movement of combustion air 102 (see FIG. 2). Liquid condensate may contact the body 207 affixed to second panel 201 as the condensate is being removed from the system. The material of body 207 on second panel 201 is sufficiently corrosion resistant to resist corrosion resulting from contact with the liquid condensate. However, particularly during shutdown or other interruption, the condensate may flow toward first panel 203, wherein escaping condensate may contact the body 207 affixed to first panel 203. As above, with respect to body 207 on second panel 201, the material of body 207 on first panel 203 is sufficiently corrosion resistant to resist corrosion resulting from contact with the liquid condensate.

Figure 5:
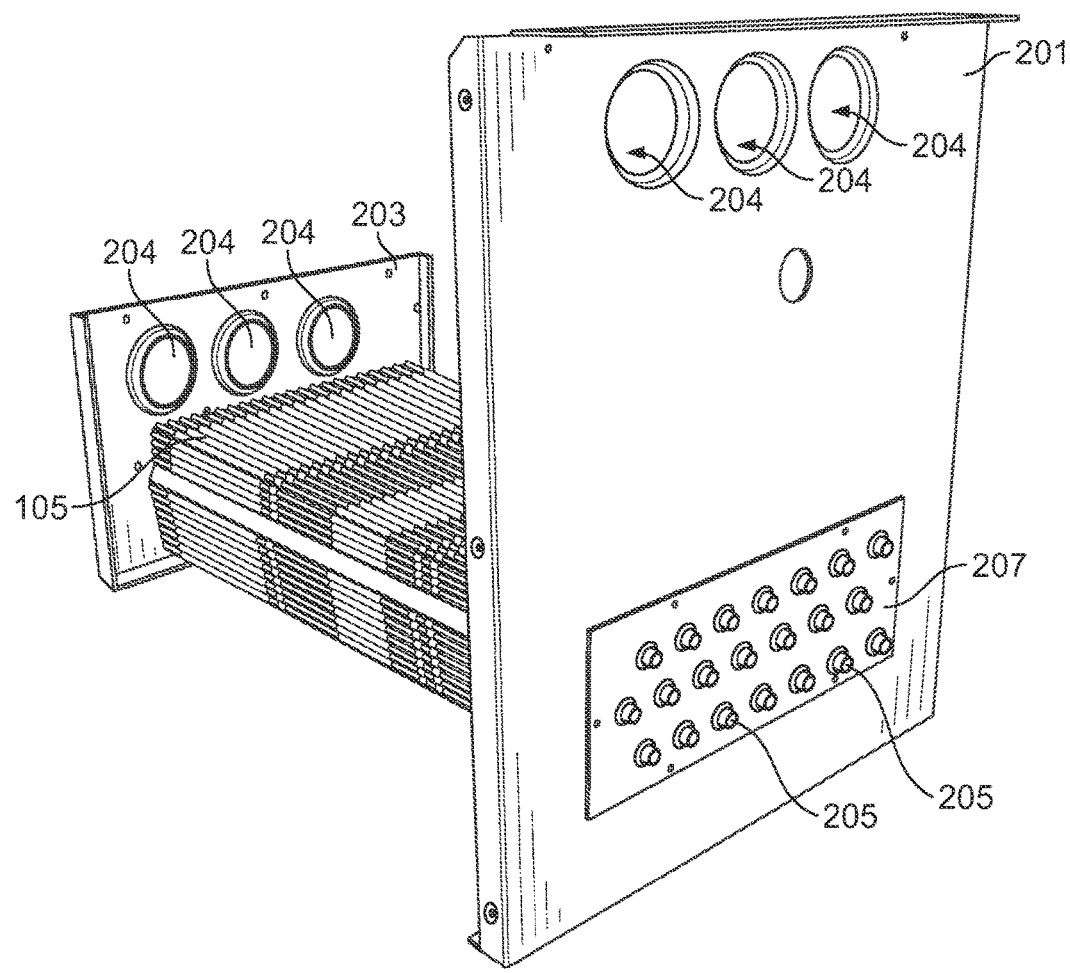
FIG. 5 is a top, front perspective view of a portion of a furnace according to an embodiment of the disclosure.

FIG. 5 shows a perspective view of a second heat exchanger having the arrangement shown in FIG. 4, viewed in the direction of second panel 201. As shown in FIG. 5, body 207 is affixed to second panel 201 in close proximity to conduits 205, wherein the body 207 provides surfaces that resist corrosion from liquid heat transfer fluid escaping from conduits 205. Second heat exchanger 105 is shown as including a plurality of fins surrounding the plurality of conduits 205, but is not limited to the structure shown, and may include any structure or geometry that facilitates heat transfer with the fluid within conduits 205. Alternate arrangements may include shell and tube, plate or other configurations affixed to conduits 205 suitable for heat transfer. In addition, second panel 201 is not limited to the geometry shown and may include alternate geometries, as desired for operation of furnace 100, including, but not limited to corresponding size and geometry to receive first heat exchanger 102, facilitate exhausting of combustion air 102, removal of condensate 113, and positioning of burner 101 (see FIG. 2).

Figure 6:
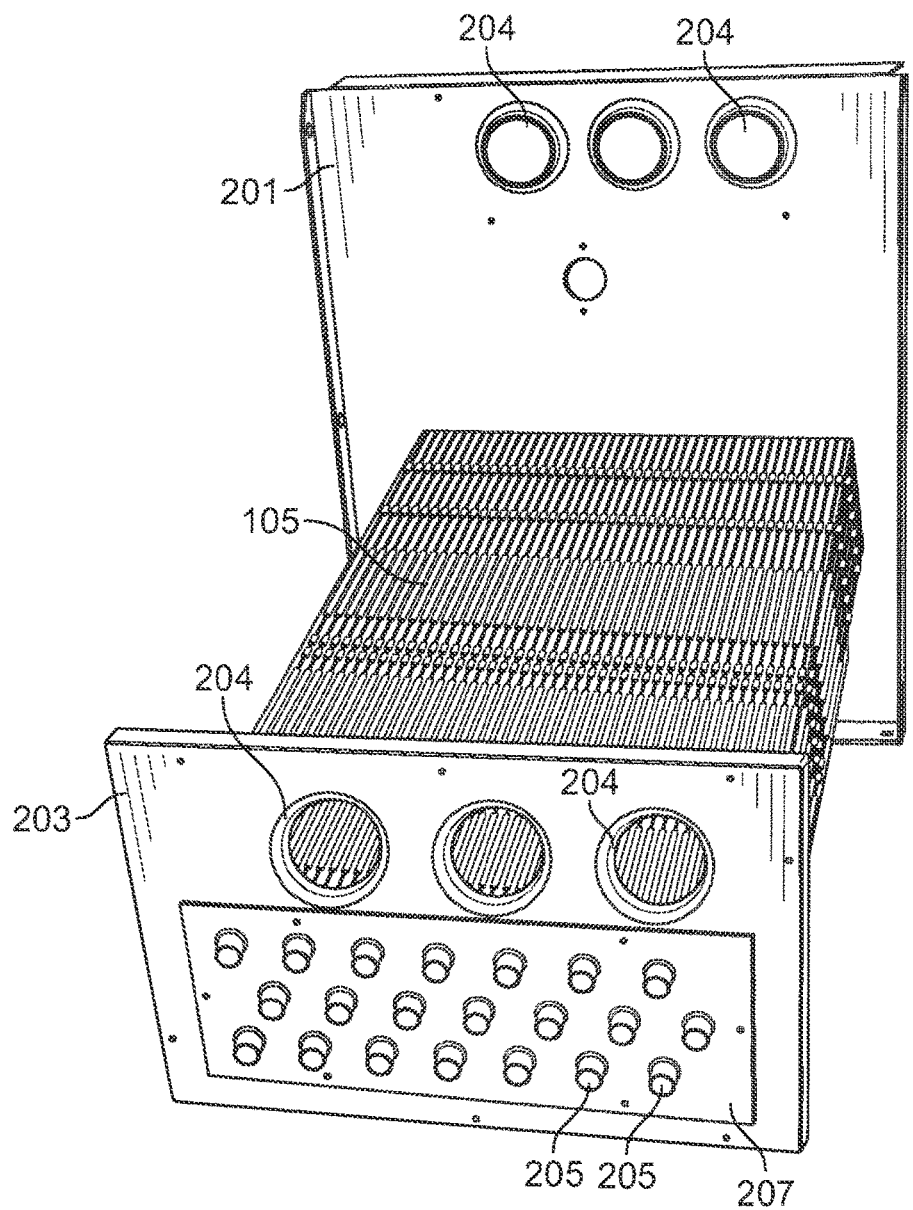
FIG. 6 is a top, rear perspective view of a portion of a furnace according to an embodiment of the disclosure.

FIG. 6 shows a perspective view of second heat exchanger 105 of FIGS. 3-4, viewed in the direction of first panel 203. As shown in FIG. 6, body 207 is affixed to first panel 203 in close proximity to conduits 205, wherein the body 207 provides surfaces that resist corrosion from liquid heat transfer fluid escaping from conduits 205. In addition, first panel 203 is not limited to the geometry shown and may include alternate geometries, as desired for operation of furnace 100, including, but not limited to corresponding size and geometry to receive first heat exchanger 102 and management of flow of gaseous heat exchange fluid from first heat exchanger 102. For example, the condensate is collected in a condensate trap or other structure (not shown) and is removed from furnace 100. The condensate is prevented from directly contacting second panel 201 or first panel 203 by body 207 in order to minimize corrosion. Contact with the liquid condensate is limited to body 207 and other structures fabricated from and include corrosion resistant material.

Figure 7:
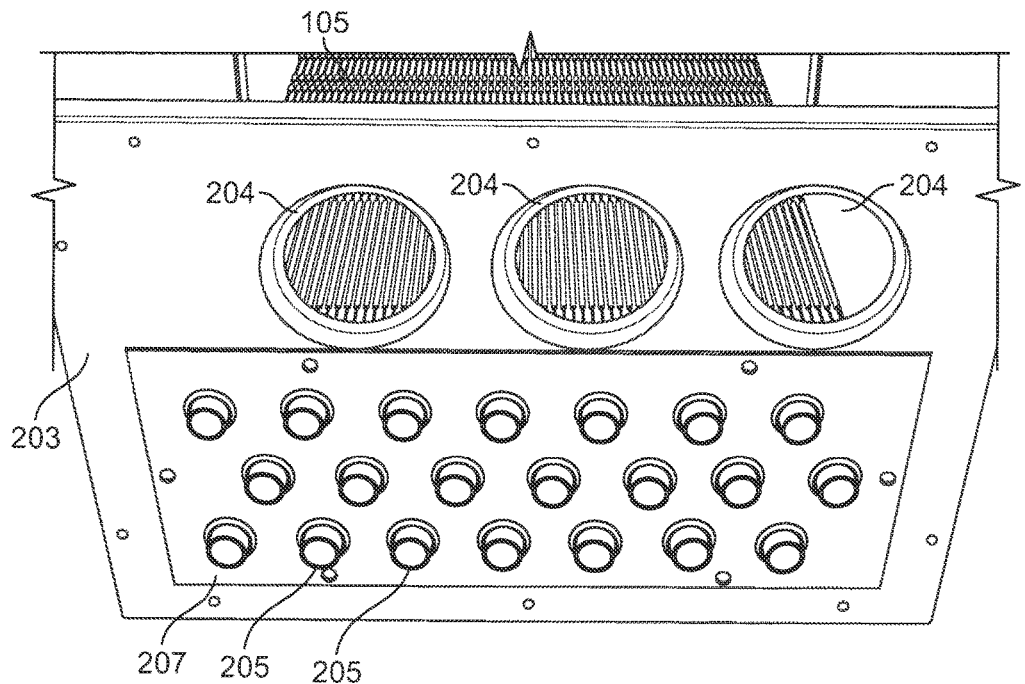
FIG. 7 is a perspective view of a corrosion resistant body on the first panel according to an embodiment of the disclosure.

FIG. 7 shows an enlarged view of the plate 207 affixed to the first panel 203 according to an embodiment of the present disclosure. As shown, the plate 207 conforms to the tubes 205 and provides corrosion resistance for any liquid condensate that escapes from the tubes 205, particularly during shutdown, start up or during interruptions in service. The size and geometry of plate 207 is not limited to the size and geometry shown.

Figure 8:
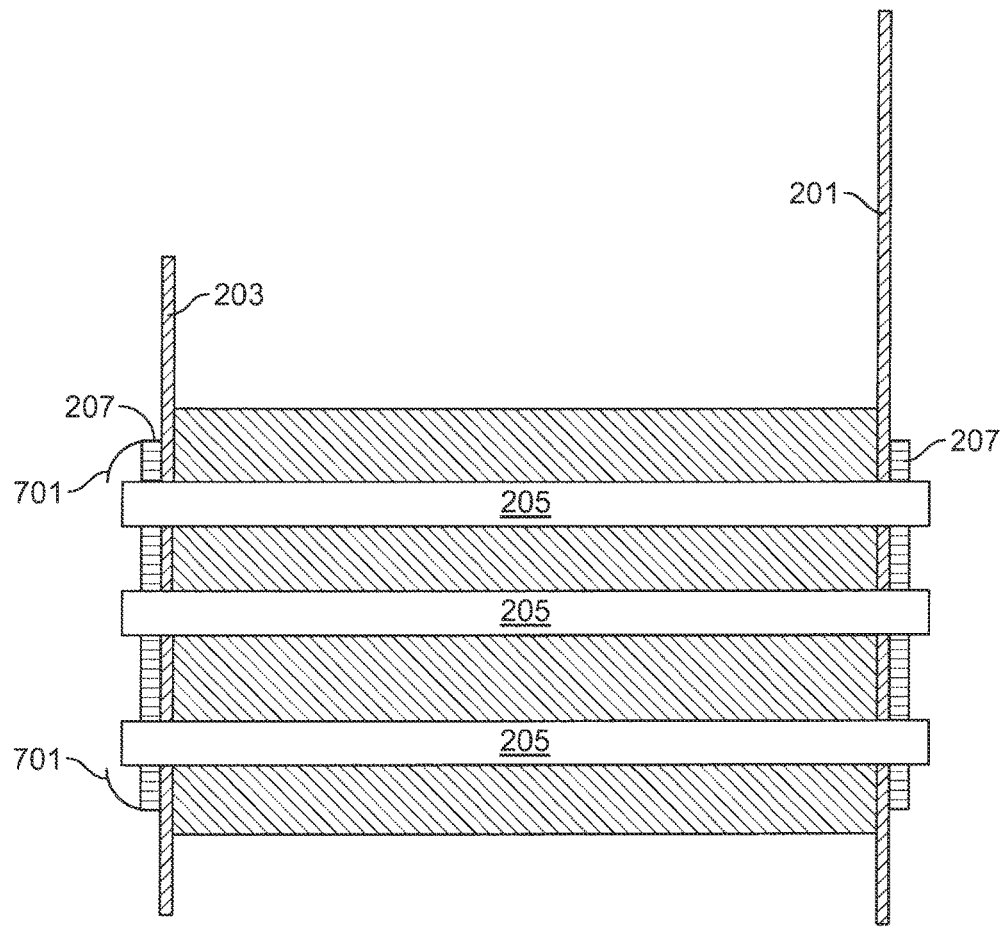
FIG. 8 is a cross-section view of a portion of a furnace according to an embodiment of the disclosure.

FIG. 8 shows a second heat exchanger 105 for use with the present disclosure according to another embodiment, including corrosion resistant bodies 207 affixed to each of front and first panels 201, 203. In addition, a condensate collector 701, such as a drip pan, is affixed to body 207 on first panel 203. Although not shown, a gasket or other similar structure may be utilized to provide sealing against body 207. In other embodiments, body 207 may be fabricated into first panel 203, as a unitary component, wherein condensate collector 701 may be affixed to first panel 203 to provide the desired corrosion resistance. Particularly during shutdown or other interruption, the condensate formed in second heat exchanger 105 may flow toward first panel 203, wherein condensate collector 701 collects the condensate. Condensate collector 701 is fabricated from and includes a corrosion resistant material. Suitable corrosion resistant material for fabrication of condensate collector 701, includes, but is not limited to, stainless steel, such as 29-45C stainless steel, corrosion resistant metal or alloys or high temperature polymeric material.

Figure 9:
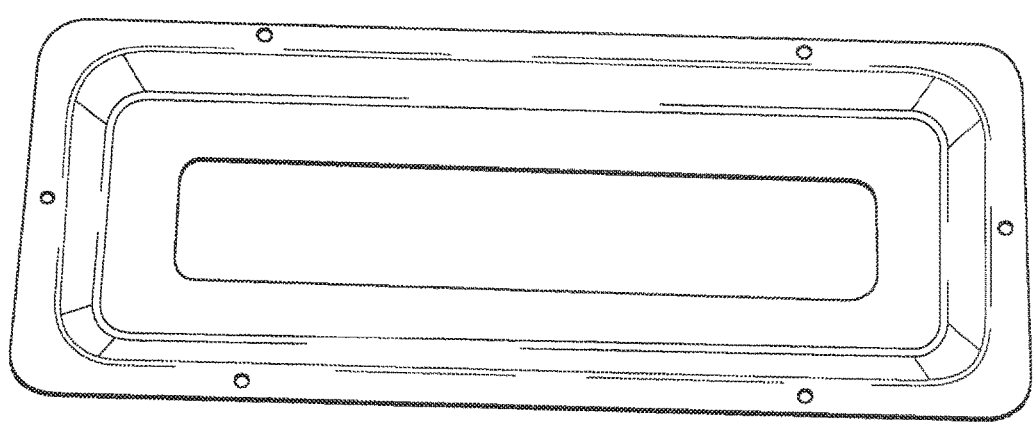
FIG. 9 is a perspective view of a condensate collector according to an embodiment of the disclosure.

FIG. 9 shows a condensate collector 701 according to an embodiment of the present disclosure. Condensate collector 701 includes a geometry that collects condensate in a plurality of orientations, when affixed to the body 207 (see FIG. 10). For example, furnace 100 may be rotated or otherwise oriented 90 degrees or 180 degrees along a horizontal axis, wherein in each orientation the condensate from second heat exchanger 105 may be collected by the condensate collector 701. In addition, condensate collector 701 is configured to provide sufficient condensate collection capacity to contain the condensate escaping from second heat exchanger 105.

Figure 10:
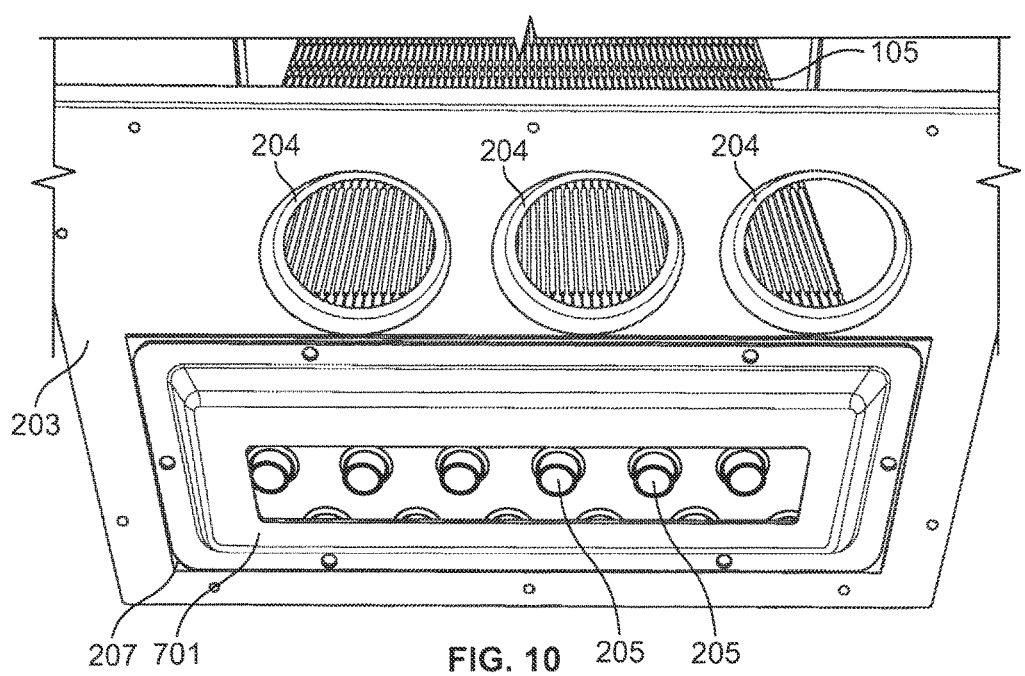
FIG. 10 is a perspective view of a condensate collector installed on the first panel according to an embodiment of the disclosure.

FIG. 10 shows a condensate collector 701 affixed onto a body 207 of first panel 203 according to an embodiment of the present disclosure. As discussed above, liquid condensate escaping conduits 205 is collected by the condensate collector 701. Contact with the liquid condensate is substantially limited to the body 207 and condensate collector 701, which are fabricated from and include corrosion resistant material, such as 29-4C stainless steel or Grade 2205 stainless steel. The liquid is substantially prevented from contacting first panel 203 directly and from contacting structures, including the headers for directing combustion air 102 (not shown), first panel 203, first heat exchanger 103 or other structures fabricated from and include less corrosion resistant materials. The liquid condensate may be collected and retained within the condensate collector 701 until the liquid volatilizes, such as by evaporation or from heating and/or activation of blower 109 from furnace 100 operation.

Figure 11:
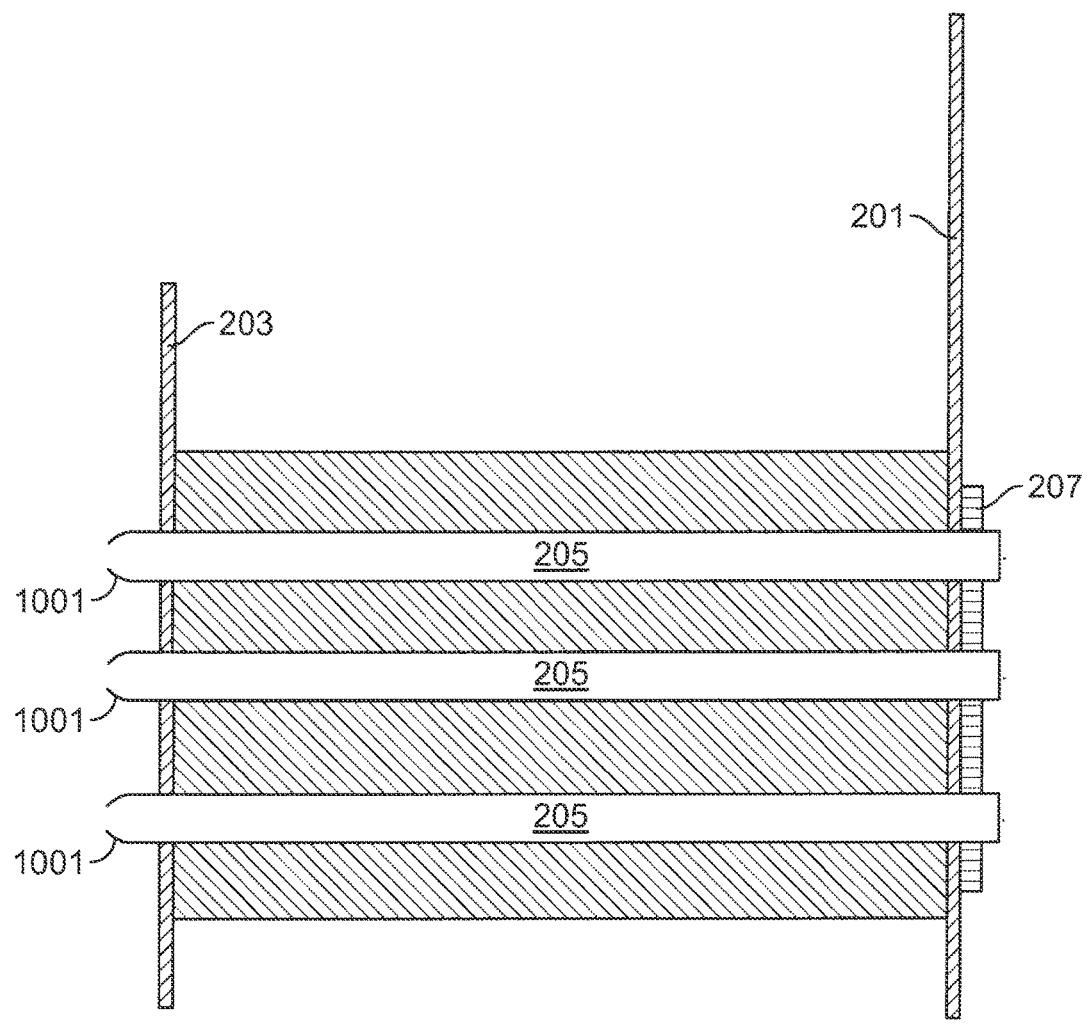
FIG. 11 is a cross-section view of a portion of a furnace according to another embodiment of the disclosure.

FIG. 11 shows a second heat exchanger 105 for use with the present disclosure according to another embodiment, including a corrosion resistant body 207 affixed to second panel 201. As shown, conduits 205 are configured with a tapered portion 1001, which provides a circumferential lip sufficient to prevent flow of liquid condensate from second heat exchanger 105 and substantially prevent contact of liquid condensate with first panel 203. Tapered portion 1001, which is formed from the material of the conduits, preferably stainless steel, provides the desired corrosion resistance when contacted with liquid condensate. Specifically, during shutdown or other interruption, the condensate formed in second heat exchanger 105 may flow toward first panel 203, wherein liquid condensate is collected by the tapered portion and substantially prevented from escaping conduit 205 on the end of the conduit in proximity to first panel 203. Further, tapered portion 1001 is preferably configured to permit the orientation of the furnace system in a plurality of orientations. For example, furnace 100 may be rotated 90 degrees or 180 degrees along a horizontal axis, wherein in each orientation the liquid condensate from second heat exchanger 105 may be collected by tapered portion 1001. In another embodiment, a body 207 may be affixed to first panel 203 to further enhance the corrosion resistance.

Figure 12:
FIG. 12 is a perspective view of tubes of the second heat exchanger configured according to an embodiment of the disclosure.

FIG. 12 illustrates a conduit 205 having tapered portions 1001. The amount of taper, as the resultant fluid collection capacity may be varied, as desired, for operational parameters and the amount of condensate control required. Tapered portion 1001 may be formed using any known technique for metal fabrication, including, but not limited to, machining, working or forming tapered portion 1001 into conduit 205. Tapered portion 1001 includes a bend or curve provided circumferentially about an end of conduit 205, wherein the bend or curve is sufficient to collect liquid condensate. Although tapered portion 1001 has been shown and described as a circumferential lip, other geometries, such as bulges, reservoirs, concave protrusions or any other geometry capable of collecting liquid may be utilized.

It should be understood that the application is not limited to the details or methodology set forth in the description or illustrated in the figures. It should also be understood that the phraseology and terminology employed herein is for the purpose of description only and should not be regarded as limiting.

While the exemplary embodiments illustrated in the figures and described are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application. Therefore, it is intended that the invention not be limited to the particular embodiment disclosed as the best mode contemplated for carrying out this invention, but that the invention will include all embodiments falling within the scope of the appended claims.

The invention claimed is:

1. A furnace comprising:
a first heat exchanger;
a second heat exchanger in fluid communication with the first heat exchanger;
a first panel, the first panel being connected to the first heat exchanger and the second heat exchanger;
a second panel positioned opposite the first panel, the second panel being connected to the first heat exchanger and the second heat exchanger;
a first corrosion resistant body affixed to the first panel, the first corrosion resistant body being positioned near the second heat exchanger to block condensate from the second heat exchanger from contacting the first panel;
a second corrosion resistant body affixed to the second panel, the second corrosion resistant body being positioned near the second heat exchanger to block condensate from the second heat exchanger from contacting the second panel;
the first corrosion resistant body having a surface area less than the first panel and larger than an end of the second heat exchanger;
the second corrosion resistant body having a surface area less than the second panel and larger than an end of the second heat exchanger; and
a first condensate collector fixed to the first corrosion resistant body such that condensate is blocked from directly contacting the first panel.

2. The furnace of claim 1 wherein the first panel and the second panel each comprise a material having a greater susceptibility to corrosion than the first corrosion resistant body and the second corrosion resistant body.

3. The furnace of claim 1 wherein the first corrosion resistant body and the second corrosion resistant body each comprise a plate.

4. The furnace of claim 1 wherein the first corrosion resistant body and the second corrosion resistant body each comprise stainless steel.

5. The furnace of claim 1 wherein:
the first heat exchanger comprises a plurality of tubes;
the second heat exchanger comprises a plurality of conduits;
the first panel comprises a plurality of first openings to attach a first end of each tube of the plurality of tubes and a plurality of second openings to attach a first end of each conduit of the plurality of conduits; and
the second panel comprises a plurality of first openings to attach a second end of each tube of the plurality of tubes and a plurality of second openings to attach a second end of each conduit of the plurality of conduits.

6. The furnace of claim 5, wherein the first corrosion resistant body conforms to the first ends of the plurality of conduits and the second corrosion resistant body conforms to the second ends of the plurality of conduits.

7. The furnace of claim 1, wherein the first corrosion resistant body is one of welded or brazed to a surface of the first panel and the second corrosion resistant body is one of welded or brazed to a surface of the second panel.

8. The furnace of claim 1 wherein the second heat exchanger includes a plurality of fins.

9. The furnace of claim 1, wherein the furnace has condensate control for blocking condensate from contacting the first panel and the second panel, while permitting a plurality of furnace orientations.

10. The furnace of claim 9, wherein condensate control for the first panel is achieved by a fluid tight arrangement of the first condensate collector and the first corrosion resistant body, and condensate control for the second panel is achieved by a fluid tight arrangement of a second condensate collector and the second corrosion resistant body.

11. The furnace of claim 1, wherein the first panel and first condensate collector are composed of the same material.

12. A heat exchanger comprising:
a first panel;
a second panel positioned opposite the first panel;
a plurality of tubes, the plurality of tubes each having a first end connected to the first panel and a second end opposite the first end connected to the second panel, the plurality of tubes being positioned to permit flow of heat transfer fluid from the second end to the first end;
a plurality of conduits, the plurality of conduits each having a first end connected to the first panel and a second end opposite the first end connected to the second panel, the plurality of conduits being positioned to permit flow of heat transfer fluid from the first end to the second end, the first ends of the plurality of conduits being positioned to receive heat transfer fluid from the first ends of the plurality of tubes;
a first corrosion resistant body laminated to a surface of the first panel, the first corrosion resistant body being in physical contact with the plurality of conduits to block condensate from the plurality of conduits from contacting the surface of the first panel;
a second corrosion resistant body laminated to a surface of the second panel, the second corrosion resistant body being in physical contact with the plurality of conduits to block condensate from the plurality of conduits from contacting the surface of the second panel; and
the first corrosion resistant body having a surface area less than the first panel and surrounding the first end of the plurality of conduits;
the second corrosion resistant body having a surface area less than the second panel and surrounding the second end of the plurality of conduits; and
a first condensate collector fixed to the first corrosion resistant body such that condensate is blocked from directly contacting the first panel.

13. The heat exchanger of claim 12 wherein the first panel and the second panel each comprise a material having a greater susceptibility to corrosion than the first corrosion resistant body and the second corrosion resistant body.

14. The heat exchanger of claim 12 wherein the first corrosion resistant body and the second corrosion resistant body each comprise stainless steel.

15. The heat exchanger of claim 12 wherein the first corrosion resistant body and the second corrosion resistant body each comprise a plate.

16. The heat exchanger of claim 12 wherein:
the first panel comprises a plurality of first openings to attach the first ends of the plurality of tubes and a plurality of second openings to attach the first ends of the plurality of conduits; and
the second panel comprises a plurality of first openings to attach the second ends of the plurality of tubes and a plurality of second openings to attach the second ends of the plurality of conduits.

17. The heat exchanger of claim 12 wherein the first corrosion resistant body conforms to the first ends of the plurality of conduits and the second corrosion resistant body conforms to the second ends of the plurality of conduits.

18. The heat exchanger of claim 12 further comprising a plurality of fins surrounding the plurality of conduits.

19. A method of assembling a furnace comprising:
connecting a first heat exchanger between a first panel and a second panel;
connecting a second heat exchanger between the first panel and the second panel, the second heat exchanger comprising a plurality of conduits;
laminating a first plate to the first panel, the first plate comprising a corrosion resistant material;
laminating a second plate to the second panel, the second plate comprising a corrosion resistant material;
conforming the first plate to first ends of the plurality of conduits to place the first plate in physical contact with the first ends of the plurality of conduits;
fixing a condensate collector to the first plate such that condensate is blocked from directly contacting the first panel; and
conforming the second plate to second ends of the plurality of conduits to place the second plate in physical contact with the second ends of plurality of conduits; and
wherein the first plate has a surface area less than the first panel and surrounding the first end of the plurality of conduits; and
wherein the second plate has a surface area less than the second panel and surrounding the second end of the plurality of conduits.

20. The method of claim 19 further comprising:
blocking condensate from the plurality of conduits from contacting the first panel with the first plate; and
blocking condensate from the plurality of conduits from contacting the second panel with the second plate.

* * * * *